Jan. 21, 1930.　　　　　A. ULBING　　　　　1,744,691
FOCUSING DEVICE FOR CAMERAS
Filed Sept. 5, 1924　　　2 Sheets-Sheet 1
Fig.1.
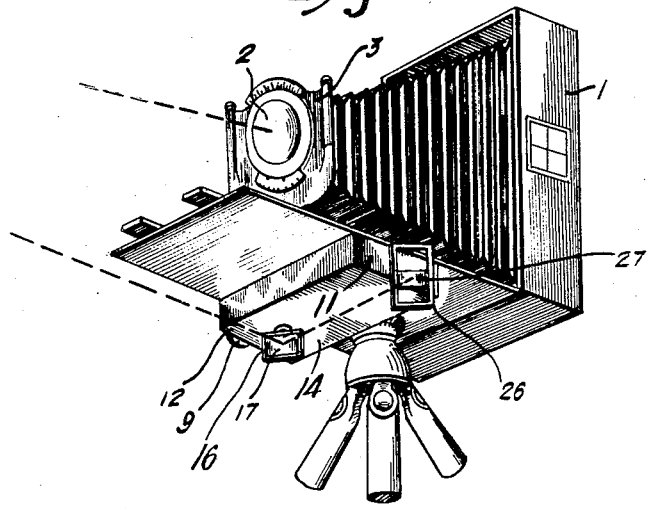
Fig.2.
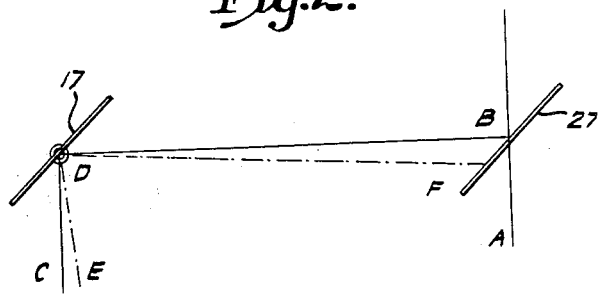
Fig.3.　　　Fig.4.
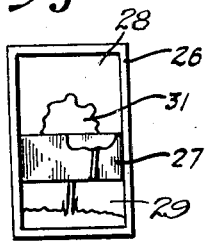 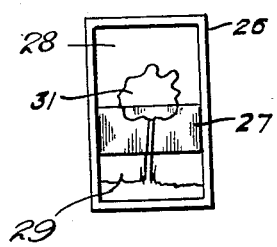
INVENTOR
ALOIS ULBING
BY
ATTORNEY Jan. 21, 1930.   A. ULBING   1,744,691
FOCUSING DEVICE FOR CAMERAS
Filed Sept. 5, 1924   2 Sheets-Sheet 2

INVENTOR
ALOIS ULBING
ATTORNEY

Patented Jan. 21, 1930

1,744,691

UNITED STATES PATENT OFFICE

ALOIS ULBING, OF OTTERSEE, UPPER AUSTRIA

FOCUSING DEVICE FOR CAMERAS

Application filed September 5, 1924. Serial No. 735,996.

This invention relates to improvements in finding and focusing mechanism for cameras, and one of the objects of the invention is to provide new and improved mechanism whereby the objective lens of the camera may be set in exact focus for objects located at varying distances from the camera, without having recourse to range finding or range estimating.

Another object of the invention is to provide mechanism of the above character, which may be readily applied to a camera, is compact, will not easily become disarranged, and which may be conveniently operated.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the drawings, wherein I have illustrated a preferred form of embodiment of my invention:

Figure 1 is a view in perspective, showing my invention applied to a camera of the conventional form.

Figure 2 is a diagrammatic view showing the arrangement of the focusing mirrors.

Figure 3 is a similar view showing the appearance of a reflected object when the objective lens of the camera is out of focus.

Figure 4 is a similar view showing the appearance of the object to the observer when the objective lens of the camera is in focus.

Figure 5:
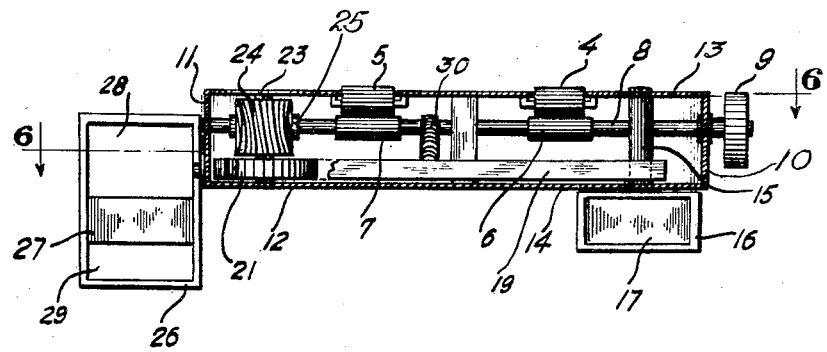
Figure 5 is a sectional elevation of the mechanism taken on line 5—5 of Figure 6, looking in the direction of the arrow.

Referring now to the drawings, wherein similar reference characters refer to similar parts throughout the several views of the drawings, the reference numeral 1 denotes a camera of the conventional type, having the object lens 2 mounted in a slidable frame 3, which is moved forwardly and rearwardly, with respect to the plate, as is usual in camera construction.

This movement of the frame 3 by means of which the object lens 2 is focused, is accomplished by the gear wheels 4 and 5, which operate a rack, not shown, mounted upon the frame 3, as is usual in camera construction. The gear wheels 4 and 5 are driven by the gear wheels 6 and 7, mounted upon the shaft 8, which shaft is operated as by means of the hand wheel 9. As above indicated, the structure so far described, is common in camera construction.

The shaft 8 is mounted in the end walls 10 and 11, of a box 12, which box is mounted upon the camera, so that it may be swung to the operative position shown in Figure 1 of the drawings, or swung upwardly and inwardly to form a part of the closure of the camera box when the camera is not in use.

Journalled in the side walls 13 and 14 of the box 12, is a shaft 15, one end of which carries the frame 16 of a mirror 17. It will be seen that when the shaft 15 is rotated, the frame 16 and the mirror 17 will be swung on the axis of the shaft 15. Attached to the shaft 15 is one end of a lever 19, the opposite end 20 of said lever being held in engagement with the periphery 21 of a cam 22, said disc being carried by the shaft 23 journalled in the side walls 13 and 14 of the box 12. The cam 22 is calculated and constructed in the following manner:

therein the mirror 27. The frame 26 is provided with the open spaces 28 and 29, located

*Calculations for an eccentric disk (Fig. 6, 22) for a focal distance of 15 cm.*

Figure 6:
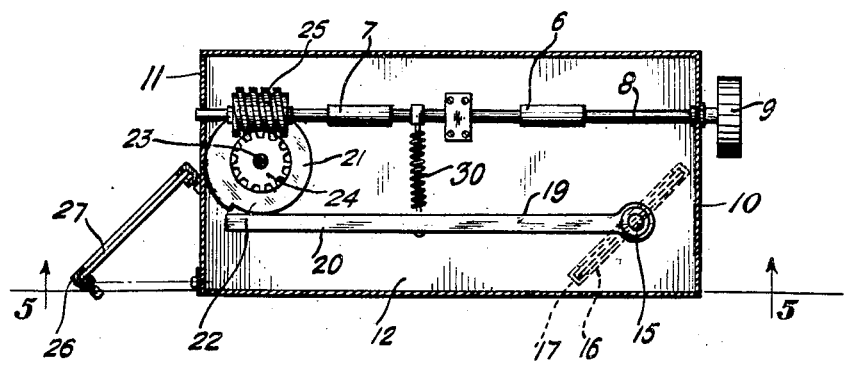
Figure 6 is a sectional plan view taken on line 6—6 of Figure 5.
Figure 7:
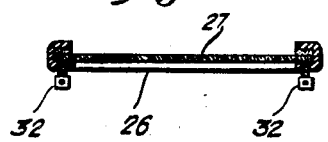
Figure 7 is a sectional elevation, taken through one of the mirrors, showing means whereby the mirror may be given a slight adjustment.

| 1 | 2 | 3 Revolutions of the contact disk Fig. 6, 9 | 4 Torsion of the eccentric disk Fig. 6, 22 | 5 $tg\,d = \frac{\delta}{D}$ | 6 $d$ | 7 $\frac{d}{2}$ | 8 $tg\,\frac{d}{2}$ | 9 $\Delta r = l\,tg\,\frac{d}{2}$ |
|---|---|---|---|---|---|---|---|---|
| | D | $\Delta$ | | | | | | |
| 1 m | 22.5 m | 2.25 | 135° | 0.10000 | 5°50' | 2°56' | 0.05095 | 3.82 m |
| 1.5 | 15. | 1.5 | 90° | 0.06666 | 3°48' | 1°54' | 0.03317 | 2.49 |
| 2. | 11.25 | 1.125 | 67.5° | 0.05000 | 2°51' | 1°26' | 0.02502 | 1.88 |
| 3. | 7.5 | 0.75 | 45° | 0.03333 | 1°54' | 0°57' | 0.01659 | 1.24 |
| 4. | 5.62 | 0.562 | 33.7° | 0.02500 | 1°29' | 0°45' | 0.01309 | 0.98 |
| 5. | 4.5 | 0.45 | 27° | 0.02000 | 1°10' | 0°35' | 0.01018 | 0.76 |
| 6. | 3.75 | 0.375 | 22.5° | 0.01666 | 0°58' | 0°29' | 0.00844 | 0.63 |
| 7. | 3.2 | 0.32 | 19.2° | 0.01430 | 0°50' | 0°25' | 0.00728 | 0.54 |
| 8. | 2.8 | 0.28 | 16.8° | 0.01250 | 0°44' | 0°22' | 0.00640 | 0.48 |
| 9. | 2.5 | 0.25 | 15° | 0.01111 | 0°38' | 0°19' | 0.00552 | 0.41 |
| 10. | 2.25 | 0.225 | 13.5° | 0.01000 | 0°34' | 0°17' | 0.00495 | 0.37 |
| 11. | 2.05 | 0.205 | 12.3° | 0.00911 | 0°31' | 0°16' | 0.00465 | 0.35 |
| 12. | 1.88 | 0.188 | 11.3° | 0.00833 | 0°29' | 0°15' | 0.00436 | 0.33 |
| 13. | 1.73 | 0.173 | 10.4° | 0.00771 | 0°27' | 0°14' | 0.00407 | 0.31 |
| 14. | 1.6 | 0.16 | 9.6° | 0.00714 | 0°25' | 0°13' | 0.00378 | 0.29 |
| 15. | 1.5 | 0.15 | 9° | 0.00667 | 0°24' | 0°12' | 0.00349 | 0.26 | ad 1. D = distance of the object.

ad 2. $\Delta$ = displacement of the objective = $d - F$; $d$ = distance of the plate from the objective $$\left(d = F + \frac{F^2}{D};\ D = \frac{F^2}{d-F} = \frac{F^2}{\Delta};\ \Delta = \frac{F^2}{D}\right)\ F = \text{focal length} = 15\,cm$$

ad 3. for the assumption that one revolution of the contact disk (fig 6-22) displaces the objective 10 mm.

ad 4. for the assumption that one revolution of the contact disk (fig 6, 9) displaces the eccentric disk (fig 6, 22) by 60°— ad 5.}
ad 6.}
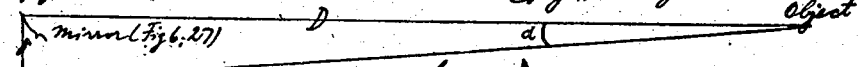

ad 7.}
ad 8.} $\frac{d}{2}$ = angle of turning of the movable lens ad 9. $\Delta r$ = eccentricity (extension of the radius) of the eccentric disk (fig 6, 22) at the point of contact with the lever (fig 6, 19)

$\Delta r = l\,tg\frac{d}{2}$ ($l$ = length of the lever (fig 6, 19) from fulcrum to point of contact with eccentric disk (fig 6, 22) = 75 mm.

S. E. & O.

Errors in calculation not inadmissible.

For manufacture it is sufficient to calculate for only a few eccentricities.

In testing, if necessary, this can be done by filing the periphery of the eccentric disk.

The shaft 23 has fixed thereon the worm wheel 24, with which meshes the worm 25 fixed on the shaft 8.

Mounted exteriorly of the box 12, and carried thereby, is a frame 26, having mounted therein the mirror 27. The frame 26 is provided with the open spaces 28 and 29, located respectively above and below the mirror 27 and said mirror 27, and the mirror 17, are located in a common horizontal plane, so that the image of an object reflected from the mirror 17 will be received by and reflected from the mirror 27. Parts of the object upon which the camera is to be focused can be observed through the open spaces 28 and 29 of the frame 26.

The mirror 27 is located at an angle of 45° through the plane of the frame or box 12. The mirror 17 is also disposed at an angle approximately 45° to the plane of the box or frame 12, although its position is relatively adjustable by parts of the mechanism already described. The end 20 of the lever 19 is held in engagement with the periphery 21 of the cam 22, as by means of the retractile spring 30.

Having thus described the construction of this embodiment of my invention, the operation thereof may now be understood.

It may first be noted that the mirror 17 reflects only a part of the focused object, and the partial image of the object is reflected by the mirror 27. The object itself may be partially observed directly through the openings 28 and 29. Thus the person using the device looking through the frame 26 will see the upper and lower portions of the object directly through the open spaces 28 and 29 of the frame 26, and a reflected image of an intermediate part of the object will appear upon the mirror 27, as illustrated in Figures 3 and 4, wherein the object 31 is assumed to be a tree.

The eccentric disk 21 is so formed as to correspond with the type of lens used and the general construction of the apparatus. In the present instance, the eccentric disk 21 corresponds with a lens having a focal length of 15 cm. (15 centimeters=5-29/32″). Adjustment of the mirrors is first made by focusing upon a very distant object, setting the pivotally mounted mirror by means of the adjusting screws, whereby the lens focus remains set for an "indefinite" or "endless" position. When this is being accomplished, the eccentric disk 21 is in such position that the end of the arm 20 will be in its nearest position to the axis of the eccentric disk or cam 21.

As shown in Figure 2, parallel light rays from a very distant object (A. B. and D. E.) do not meet, so that the reflected picture as illustrated will not appear at B but at F. The images in the finder will then appear about as shown in Figure 3. To produce the matched picture of Figure 4, it is only necessary to turn the adjustable mirror a certain angular distance (½ the angle of incidence). This is accomplished by turning the operating handle 9 which simultaneously moves the object lens of the camera toward or from the plate and swings the pivotally mounted mirror 17 to such a point that the image of the object appearing on the mirror 27 will exactly match with the parts of the object directly observed through the frame 26. As stated, the relation of the cam or eccentric disk 21 to the lens, is such that when the primary adjustment is made at an infinite distance, the aforesaid co-relation between cam and lens will be maintained for lesser distances down to the focal distance of fifteen centimeters, for which the present disk is plotted or calculated.

It will accordingly be seen that I have provided a construction well adapted to attain, among others, all the ends and objects pointed out, in an exceedingly simple yet efficient manner. The device is simple in construction, is not liable to become disordered, and can be constructed at a modicum of cost.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. The combination with a camera, of an auxiliary focusing device attached thereto, comprising a fixed mirror and a movable mirror, means whereby the movable mirror and the objective lens of the camera are operatively connected, and means associated with the fixed mirror whereby a part of the image of the object reflected thereon, and a part of the object itself, may be simultaneously observed.

2. The combination with a camera, of an auxiliary focusing device attached thereto, comprising a fixed mirror and a movable mirror, said mirrors being disposed in the same horizontal plane, means whereby the movable mirror and the objective lens of the camera are operatively connected, and means associated with the fixed mirror whereby a part of the image of the object reflected therein, and a part of the object itself may be simultaneously observed.

3. The combination with a camera, of an auxiliary focusing device attached thereto, comprising a fixed mirror and a movable mirror, said mirrors being disposed in the same horizontal plane, means whereby the movable mirror and the objective lens of the camera are operatively connected, means associated with the fixed mirror whereby a part of the image of the object reflected therein, and a part of the object itself, may be simultaneously observed, and means whereby the movable mirror may be operated so that a part of the image of the object, and those parts of the object itself directly observed, may be brought into registry.

4. The combination with a camera, of an auxiliary focusing device attached thereto, comprising a fixed mirror and a swinging mirror, said mirrors lying in the same horizontal plane, means whereby the swinging mirror and the objective lens of the camera are operatively connected, means for simultaneously moving the objective lens of the camera and moving said swinging mirror, comprising a shaft operatively connected with the objective lens of the camera, an eccentrically mounted disc, a driving connection between said shaft and said disc, and a lever having one end connected with said swinging mirror, and the opposite end engaging said eccentrically mounted disc.

5. The combination with a camera, of an auxiliary focusing device attached thereto, comprising a fixed mirror and a swinging mirror, said mirrors lying in the same horizontal plane, means whereby the swinging mirror and the objective lens of the camera are operatively connected, means for simultaneously moving the objective lens of the camera and moving said swinging mirror, comprising a shaft operatively connected with the objective lens of the camera, an eccentrically mounted disc, a driving connection between said shaft and said disc, a lever having one end connected with said swinging mirror, and the opposite end engaging said eccentrically mounted disc, and resilient means for maintaining said lever in engagement with the periphery of said disc.

6. A focusing attachment for cameras, comprising as a unitary structure a box having a shaft mounted therein, said shaft having an operative connection with the movable objective lens of a camera, a pair of mirrors located in the same horizontal plane carried by said box and located exteriorly thereof, one of said mirrors being fixed and the other being movable, a shaft journalled in said box carrying the movable mirror, a third shaft journalled in said box, a disc carried by said third shaft, a worm connection between said first shaft and said third shaft, a lever having one end connected with said second shaft, and its opposite end engaging the periphery of said disc, and a spring for holding said lever in engagement with said disc.

7. The combination with a camera, of a box or frame, two mirrors mounted exteriorly of the frame, one of the mirrors being pivoted thereto, a shaft journalled in said frame, and means associated with said shaft for moving the objective lens of the camera, and for swinging said pivoted mirror, means for swinging said pivoted mirror, comprising an eccentrically mounted disc driven by said shaft, a lever having one end connected with said pivoted mirror, and its opposite end bearing on said eccentric disc, and means whereby said lever is held resiliently in engagement with the periphery of said disc.

8. A focusing attachment for cameras, comprising a box attached to the camera, said box having a longitudinally extending shaft operatively connected with the objective lens of the camera, and two transversely extending shafts, one of which carries a mirror located exteriorly of said box, the other of said transverse shafts carrying an eccentrically mounted disc, a worm driving connection between said shaft and said second mentioned transverse shaft, a lever having one end connected with said first mentioned transverse shaft, and its opposite end resting in peripheral engagement with said disc, a spring for holding said lever and said disc in operative engagement, and a second mirror fixed exteriorly of said box, said mirrors lying in the same horizontal plane, and said fixed mirror having means whereby the object may be directly observed.

In testimony whereof, I affix my signature.

ALOIS ULBING.